United States Patent
Sung

(10) Patent No.: US 10,655,594 B2
(45) Date of Patent: May 19, 2020

(54) UNIAXIAL POWER CONVERTING APPARATUS

(71) Applicant: INGINE, INC., Seoul (KR)

(72) Inventor: Yong Jun Sung, Gyeonggi-do (KR)

(73) Assignee: INGINE, INC., Seoul (KR)

( * ) Notice: Subject to any disclaimer, the term of this patent is extended or adjusted under 35 U.S.C. 154(b) by 0 days.

(21) Appl. No.: 16/088,127

(22) PCT Filed: Nov. 25, 2016

(86) PCT No.: PCT/KR2016/013724
§ 371 (c)(1),
(2) Date: Sep. 25, 2018

(87) PCT Pub. No.: WO2017/164482
PCT Pub. Date: Sep. 28, 2017

(65) Prior Publication Data
US 2019/0085816 A1 Mar. 21, 2019

(30) Foreign Application Priority Data
Mar. 25, 2016 (KR) .................. 10-2016-0036073

(51) Int. Cl.
*F03B 13/18* (2006.01)
*H02K 7/18* (2006.01)

(52) U.S. Cl.
CPC .......... *F03B 13/1885* (2013.01); *F03B 13/18* (2013.01); *F03B 13/1845* (2013.01); *H02K 7/18* (2013.01); *Y02E 10/38* (2013.01)

(58) Field of Classification Search
CPC .. F03B 13/1885; F03B 13/18; F03B 13/1845; H02K 7/18

USPC ...................................... 290/42, 53
See application file for complete search history.

(56) References Cited

U.S. PATENT DOCUMENTS

| | | | |
|---|---|---|---|
| 8,042,670 B2* | 10/2011 | Bartos | F16D 41/16 192/43.1 |
| 2010/0045044 A1* | 2/2010 | Patterson | F03B 13/1865 290/53 |
| 2010/0064679 A1* | 3/2010 | Straume | F03B 13/1885 60/507 |
| 2010/0107627 A1* | 5/2010 | Morgan | B63B 35/44 60/495 |

(Continued)

FOREIGN PATENT DOCUMENTS

| | | |
|---|---|---|
| CN | 201144760 Y | 11/2008 |
| KR | 10-2004-0091165 A | 10/2004 |

(Continued)

OTHER PUBLICATIONS

International Search Report for PCT/KR2016/013724 dated Feb. 13, 2017.

*Primary Examiner* — Viet P Nguyen
(74) *Attorney, Agent, or Firm* — The PL Law Group, PLLC

(57) ABSTRACT

A uniaxial power converting apparatus includes a floating unit into which the kinetic energy of waves is inputted and which is moored at sea by a wire, a direction change unit for changing a direction of the wire, and a power conversion module for transmitting the tension of the wire to a generator. The power conversion module can transmit a driving force to a power shaft to which the generator is connected from a drum around which the wire is wound.

8 Claims, 12 Drawing Sheets

(56) References Cited

U.S. PATENT DOCUMENTS

| | | | | |
|---|---|---|---|---|
| 2011/0018275 A1* | 1/2011 | Sidenmark | ............ | F03B 13/1815 290/53 |
| 2011/0031750 A1* | 2/2011 | Kreissig | ............... | F03B 13/1885 290/53 |
| 2011/0115229 A1* | 5/2011 | Rourke | ................... | F03B 13/20 290/53 |
| 2012/0096847 A1* | 4/2012 | Boyd | ....................... | E02B 9/08 60/497 |
| 2012/0235413 A1* | 9/2012 | Piccinini | ............. | F03B 13/1865 290/53 |
| 2013/0269333 A1* | 10/2013 | Williams | .............. | F03B 13/182 60/506 |
| 2014/0117671 A1* | 5/2014 | Gregory | .................. | F03B 13/22 290/53 |
| 2015/0000263 A1* | 1/2015 | Foster | ..................... | F03B 13/16 60/504 |
| 2015/0275847 A1* | 10/2015 | Sung | ................... | F03B 13/1885 74/37 |
| 2016/0215751 A1* | 7/2016 | Sung | ................... | F03B 13/1885 |
| 2017/0226984 A1* | 8/2017 | Gregory | .................. | F03B 15/02 |
| 2018/0187644 A1* | 7/2018 | Sung | ....................... | B63B 21/50 |
| 2019/0024622 A1* | 1/2019 | Sung | ................... | F03B 13/1885 |

FOREIGN PATENT DOCUMENTS

| | | |
|---|---|---|
| KR | 10-2010-0133364 A | 12/2010 |
| KR | 10-2015-0120709 A | 10/2015 |

\* cited by examiner

UNIAXIAL POWER CONVERTING APPARATUS

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/013724, filed Nov. 25, 2016, which claims priority to the benefit of Korean Patent Application No. 10-2016-0036073 filed in the Korean Intellectual Property Office on Mar. 25, 2016, the entire contents of which are incorporated herein by reference.

TECHNICAL FIELD

The present invention relates to a uniaxial power converting apparatus that converts kinetic energy of waves into rotational motion energy.

BACKGROUND ART

As energy consumption has been rapidly increased and environmental problems such as global warming have increased, interest in new and renewable energy not contaminating the environment has increased.

Of new and renewable energy sources, a wave is a high-density energy source that has attracted attention because it can be used 24 hours a day to generate power. Research and development of wave energy was started for the first time in 1940, but market of wave power generation developed late in comparison to other new and renewable energies. A commercial system appeared only recently (in 2008) for the first time.

The kinetic energy of waves is very irregular and uneven, so it is required to convert the kinetic energy into uniform rotational motion energy that can operate a generator.

SUMMARY

Technical Problem

An object of the present invention is to provide a uniaxial power converting apparatus that transmit kinetic energy of waves to a generator using wires.

A uniaxial power converting apparatus of the present invention includes: a buoyant unit moored to the seafloor by a wire to which kinetic energy of waves is input; a redirecting unit changing a direction of the wire; and a power converting module transmitting tension of the wire to a generator, in which the power converting module transmits driving force to a power shaft connected with the generator from a drum with the wire wound thereon.

The uniaxial power converting apparatus of the present invention can operate a generator, using a drum on which a wire connected to a buoyant unit that is moved by waves is wound, and a single power shaft on which the drum is installed or a plurality of power shaft coaxially arranged.

The uniaxial power converting apparatus of the present invention has a simple structure in which a drum and a generator are linked on a single power shaft or a plurality of power shaft coaxially arranged, so it can be easily manufactured and can be easily expanded to fit to the number of buoyant units.

According to the uniaxial power converting apparatus of the present invention, the structure of a power converting module is formed in a block or a module, so a buoyant wave power generation apparatus in which a generator, a power converting module, a power shaft, a drum, and a unidirectional rotary member are installed on a buoyant unit to be floated with the buoyant unit can be achieved.

DETAILED DESCRIPTION

Figure 1:
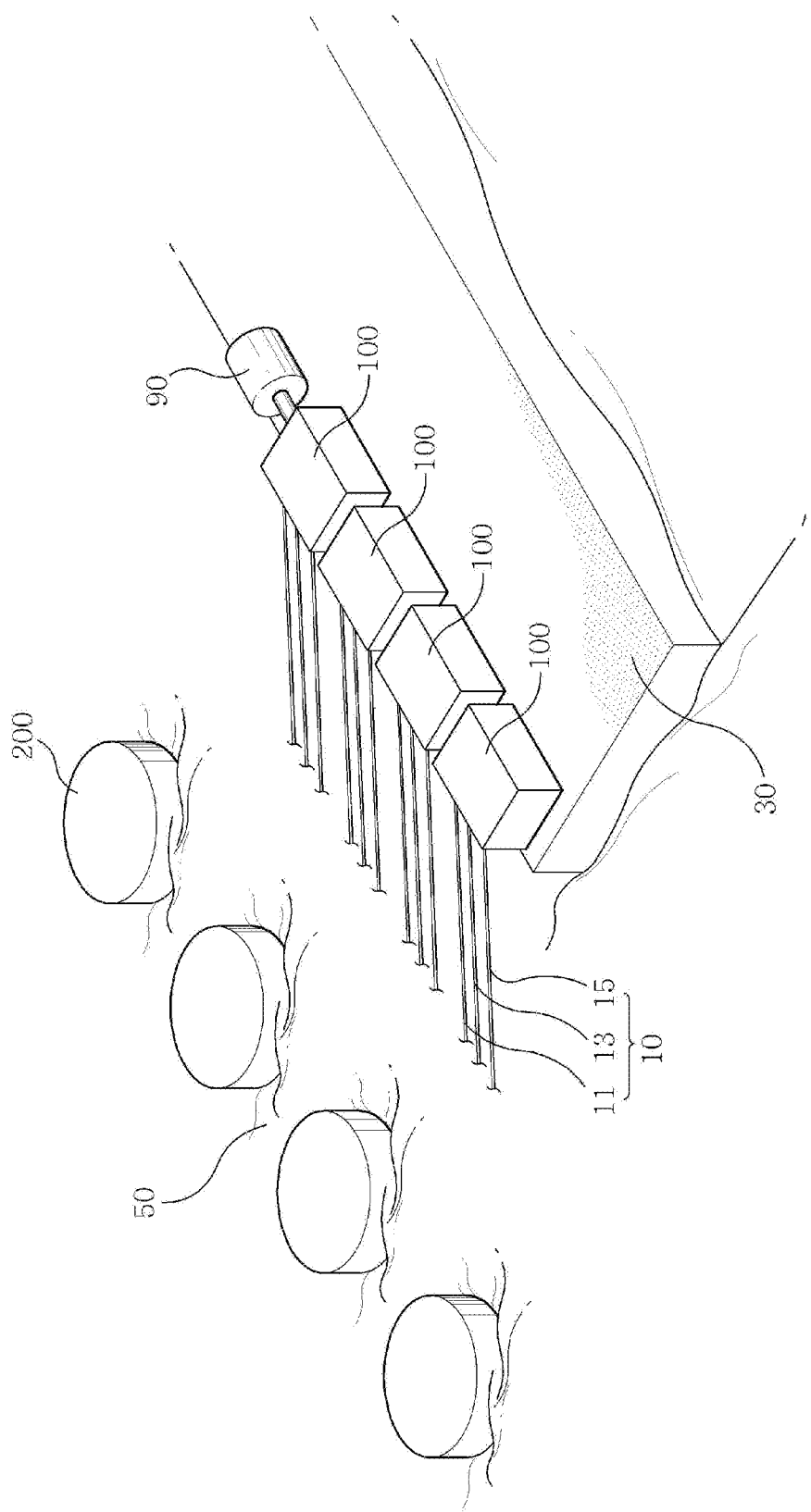
FIG. 1 is a schematic view showing a uniaxial power converting apparatus of the present invention.
Figure 2:
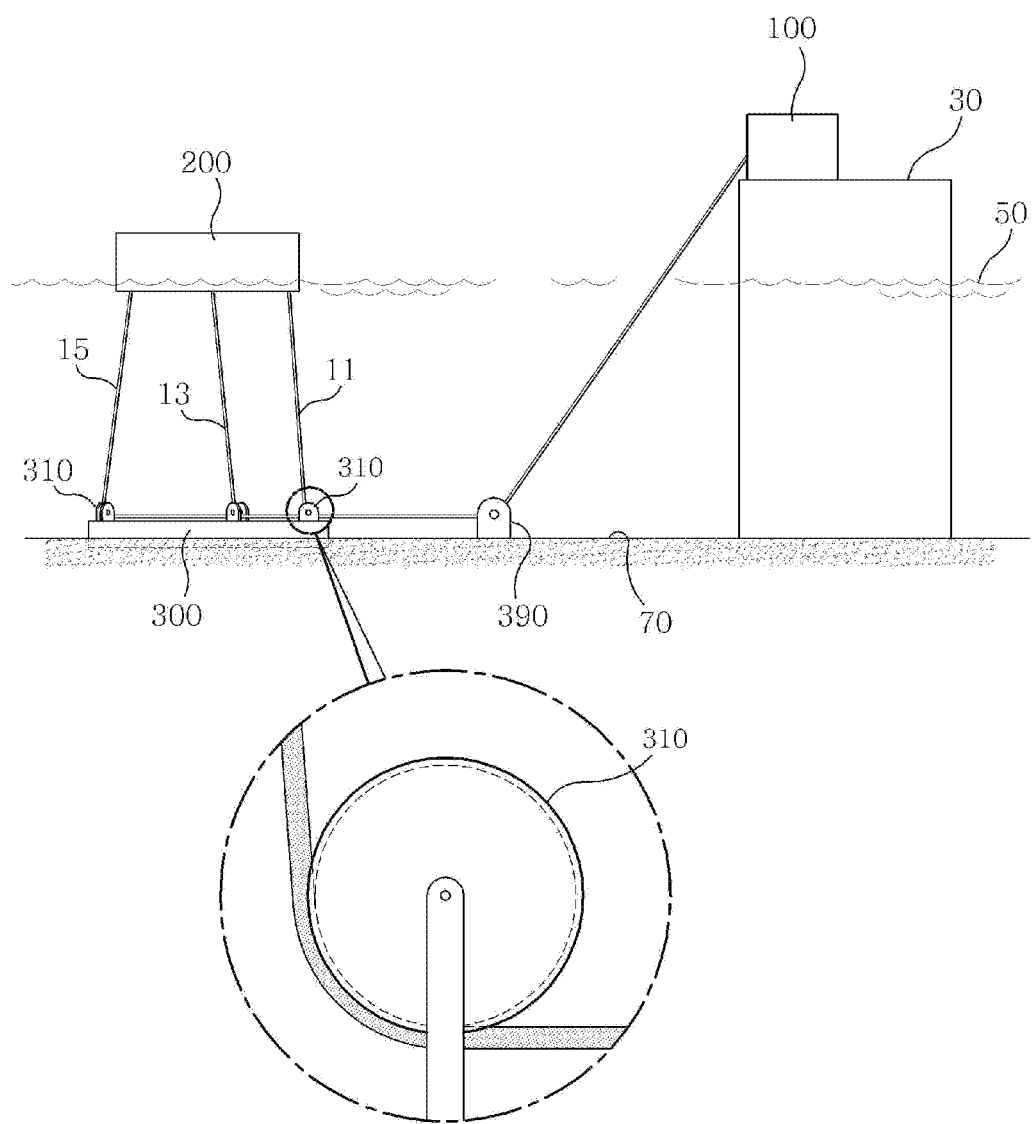
FIG. 2 is a side view showing the uniaxial power converting apparatus of the present invention.

FIG. 1 is a schematic view showing a uniaxial power converting apparatus of the present invention and FIG. 2 is a side view showing the uniaxial power converting apparatus of the present invention.

The uniaxial power converting apparatus shown in the figures may include a buoyant unit 200, a redirecting unit 310, and a power converting module 100.

The floating unit 200 is disposed on the sea surface 50 or in the sea and can generate translational or rotational motion due to a change of the sea surface 50 by waves. There may be various methods of transmitting translational motion energy or rotational motion energy of the buoyant unit 200 due to waves to a generator 90 on the land or the sea. In the present invention, kinetic energy of the buoyant unit 200 due to waves is transmitted to the generator 80 through a flexible wire 10.

A power generation system equipped with the uniaxial power converting apparatus of the present invention can be operated as follows.

First, wave force can be absorbed as kinetic energy of the buoyant unit 200 and the kinetic energy of the buoyant unit 200 can be transmitted to the generator 90 through the wire 10.

The generator 90 can convert the kinetic energy transmitted through the wire 10 into electric energy.

The buoyant unit 200 primarily absorbing wave energy as mechanical energy is moored and floated on the sea by the flexible wire 10, so it can move up/down and left/right and can rotate with movement of waves.

An end of the wire 10 may be connected to the buoyant unit 200. The wire 10 extending from the buoyant unit 200 may be connected to the generator 90 on the sea or the land or may be connected the generator on a marine structure such as a breakwater 30 at a position spaced apart from the buoyant unit 200, for example, through the base unit 300 under the sea.

A plurality of redirecting units 310 around which the wire 10 extending from the buoyant unit 200 is held may be provided on the base unit 300. The redirecting unit 310 can change the direction of the wire 10 extending from the buoyant unit 200. For example, the redirecting unit 310 may include a pulley. The redirecting unit 310 around which the wire 10 is held may be directly fixed to the seafloor or fixed to the buoyant unit 200 without being installed on the base unit 300.

Figure 3:
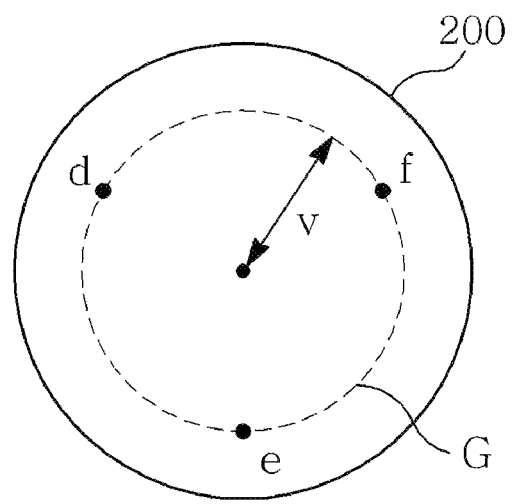
FIG. 3 is a schematic view showing a connection point where a wire is connected to a buoyant unit of the present invention.

FIG. 3 is a schematic view showing a connection point where the wire 10 is connected to the buoyant unit 20 of the present invention.

Three or more wires 10 may be connected to the buoyant unit 200 at different positions in a plane. A plurality of redirecting units 310 that change the directions of the wires 10 may also be provided in the same number as the wires 10.

Connection points d, e, and f where the wires 10 are fixed or held on the buoyant unit 200 may be spaced part from one another to transmit multi-degree of freedom kinetic energy to the generator 90.

Since the connection points d, e, and f are spaced apart from one other, the buoyant unit 200 can transmit all translational or rotational motion energy of x-axial/y-axial/z-axial translational motions and rotational motions about x-axis/y-axis/z-axis to the wires. Preferably, it may be advantageous that three of more connection points d, e, and f are not positioned in the same straight line in terms of absorbing and transmitting multi-degree of freedom motions to the wires 10.

The wires 10 and the arrangement of the connection points in the uniaxial power converting apparatus of the present invention can remarkably improve high-efficiency power generation, multi-degree of freedom power generation, continuity of the amount of generated power, environmental adaptability, and wave change correspondence.

The position of the redirecting unit 310 may be important so that the wires 10 connected to the buoyant unit 200 normally transmit kinetic energy.

Figure 4:
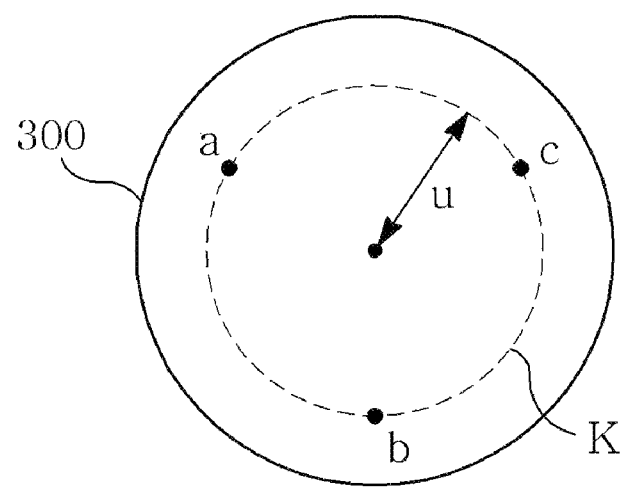
FIG. 4 is a schematic view showing the position where a redirecting unit is formed on a base unit of the present invention.

As shown in FIGS. 3 and 4, a virtual circle having an arc connecting the positions a, b, and c where the redirecting units 310 around which the wires 10 are held on the base unit 300 can be determined as a closed curve K. A virtual circle having an arc connecting the connection points d, e, and f where the wires 10 are connected to the buoyant unit 200 can be defined as a closed curve G. The diameters of the closed curves K and G are u and v, respectively.

When the diameters u and v are different, when tension is generated in a wire 10, tension in another wire 10 can be removed. Accordingly, tension is alternatively generated, so different wires 10 can absorb energy for one motion cycle of the buoyant unit 200.

Figure 5:
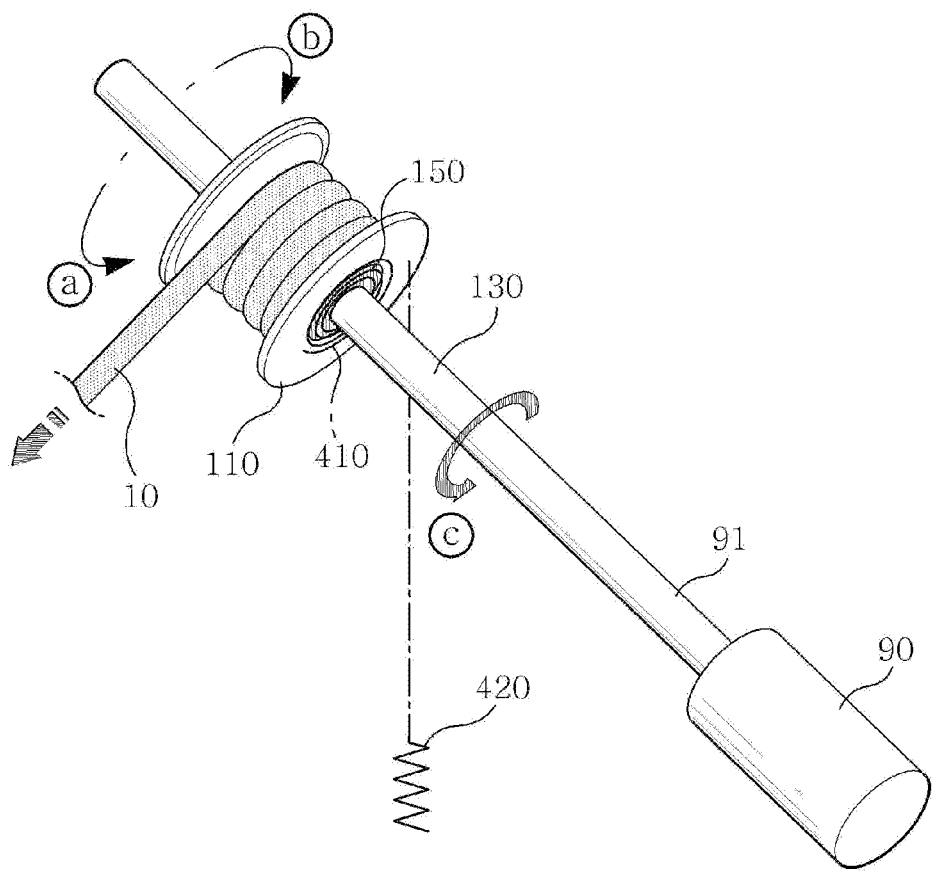
FIG. 5 is a schematic view showing an embodiment of a power converting module of the present invention.

FIG. 5 is a schematic view showing an embodiment of a power converting module of the present invention.

A power converting module 100 can transmit tension of the wires 10 transmitted through the base unit 300 or the redirecting units 310 to the generator 90. The power converting module 100 can convert the kinetic energy of the buoyant unit 200 transmitted by tension of the wires 10 into driving energy for driving the generator 90.

Figure 6:
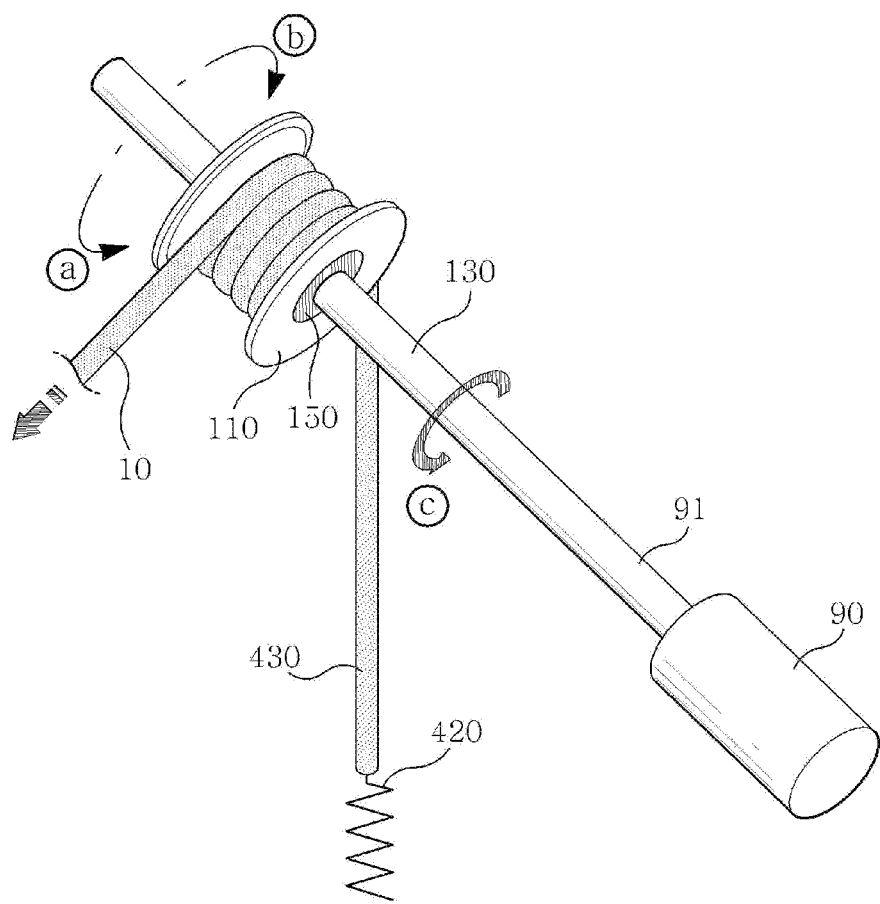
FIG. 6 is a schematic view showing another embodiment of the power converting module of the present invention.
Figure 7:
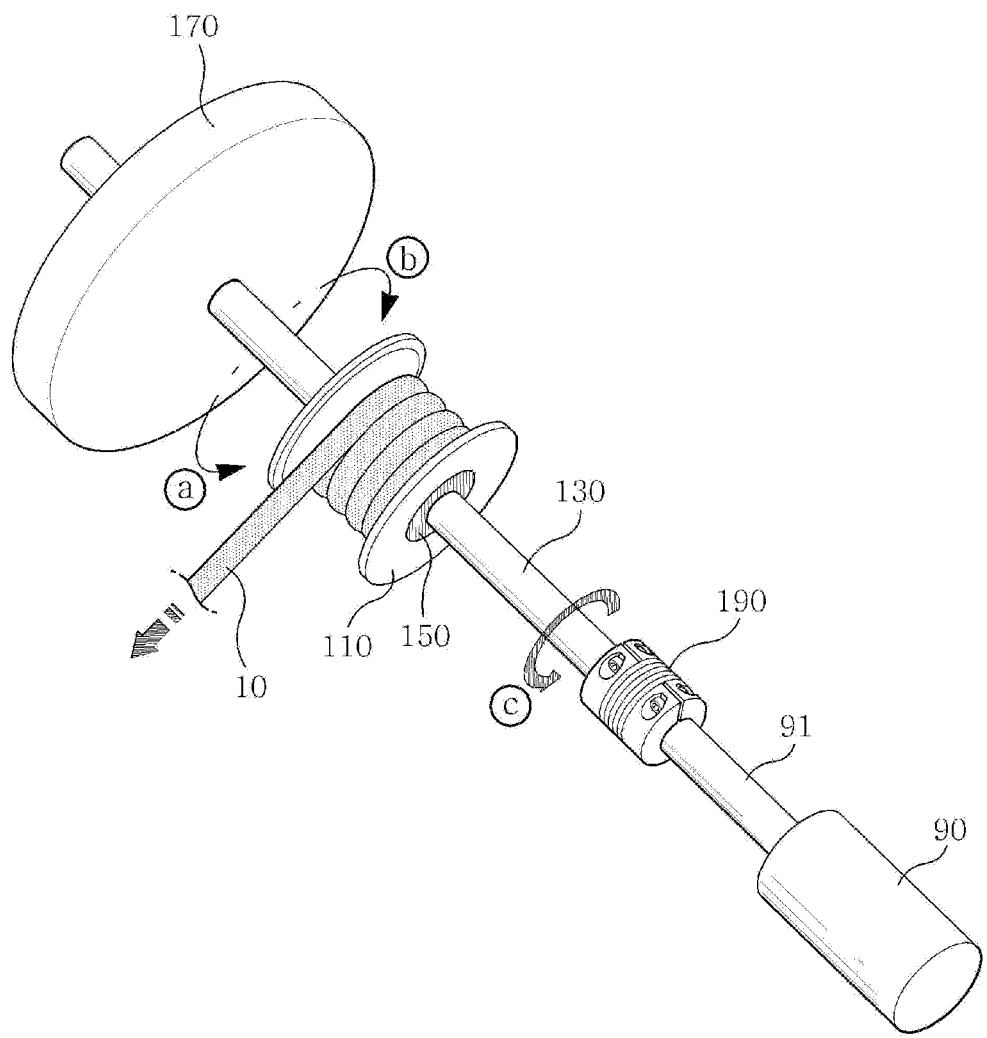
FIG. 7 is a schematic view showing another embodiment of the power converting module of the present invention.

The uniaxial power converting apparatus of the present invention can be applied to a power generation system that produces electric energy by operating the generator 90 using wave force. Accordingly, as shown in FIGS. 5 and 6, a shaft 91 of the generator 90 and a power shaft 130 may be a single common shaft as the output part of the power converting module 100. Meanwhile, as shown in FIG. 7, the power shaft 130 to which a drum 110 is connected can be connected to the shaft 91 of the generator 90 through a gear (not shown) or a coupling 190 to rotate with the shaft 91 of the generator 90.

For example, the power converting module 100 may include the drum 110 on which a wire passing through the buoyant unit 200 is wound and the power shaft 130 rotated by the drum 110. The power converting module 100 can transmit driving force to the power shaft 130 connected with the generator 90 from the drum 110 on which the wire 10 is wound. In detail, the power converting module 100 can operate the generator 80 using a single power shaft 130 on which the drum 110 is mounted or a plurality of coaxial power shafts 130.

The drum 110 may be formed in a cylindrical shape on which the wire 10 is wound. The drum 110 can be rotated forward (a) in which the wire 10 is unwound and backward (b) in which the wire 10 is wound. In other words, the drum 110 can be rotated both clockwise and counterclockwise. An embodiment in which the counterclockwise direction is the forward direction (a) and the clockwise direction is the backward direction (b) is shown in FIGS. 5 to 7.

When the buoyant unit 200 is translated in the x-axial/y-axial/z-axial directions or is rotated about the x-axis/y-axis/z-axis, tension of the wire 10 can be applied to the drum 110 through the redirecting unit 310. The drum 110 can be rotated in the forward direction (a) in which the wire 10 is wound by the tension of the wire 10.

When a wave is gone and the tension of the wire 10 is removed, the wire 10 can be rewound on the drum 110 to prepare for the next wave. The drum 110 can be rotated in the backward direction (b) in which the wire 10 is wound to rewind the wire 10. A restoring member (not shown) may be disposed in the power converting module 100 to rotate the drum 110 in the backward direction (b). The restoring member may include a spiral spring, a spring, and a weight that rotates the drum in the backward direction (b).

The power shaft 130 rotated by the drum 110 may be rotated only in a preset direction (c), unlike the drum 110 that can be rotated in both directions.

The power shaft 130 may be an output part of the power converting unit 110 connected to the shaft 91 of the generator 90. If necessary, a redirecting unit (not shown) that changes a rotational direction or a speed adjuster (not shown) such as a decelerator or an accelerator that adjusts the rotation ratio of the shaft 91 of the generator and the power shaft 130 may be disposed between the shaft 91 of the generator 90 and the power shaft 130.

The shaft 91 of the generator 90 may be rotated only in a specific direction to effectively produce electric energy and protect the generator 90. Accordingly, the power shaft 130 that can be connected to the shaft 91 of the generator 90 may be rotated only in the preset direction (c). The preset direction (c) may be one of the rotational directions of the drum 110 or a rotational direction about another axis different from the rotational axis of the drum 110.

It is advantageous that the preset direction ⓒ is the same as the forward direction ⓐ of the drum 110 to simplify the structure of the power converting module 100.

The power shaft 130 can be fixed on the drum 110 and rotated in the preset direction ⓒ when the drum 110 is rotated in the forward direction ⓐ by tension of the wire 110 generated by wave force so that wave energy is transmitted to the generator 90. In contrast, the power shaft 130 may be released from the drum 110 when the drum 110 is rotated in the backward direction ⓑ by the restoring member. Since the power shaft 130 is released from the drum 110, it can keep rotating in the present direction ⓒ even though the drum 110 is rotated in the backward direction ⓑ.

An embodiment of the restoring member is shown in FIG. 5, in which the restoring member is connected to the drum 110 and applies restoring force to the drum 110. As shown in FIG. 5, the restoring member connected to the drum 110 may be a spiral spring 150, a coil spring 420, or a weight. When the drum 110 is rotated in the forward direction ⓐ by tension of the wire 10, the restoring member 420 rewinds the wire 10 on the drum 110 by rotating the drum 110 in the backward direction ⓑ.

FIG. 6 is a schematic view showing another embodiment of a power converting module of the present invention. The restoring member shown in FIG. 6 may be a coil spring 420 or a weight. The restoring member is connected to a first end of the wire 10. The first end of the wire 10 is connected to the buoyant unit 200, a second end of the wire 10 is connected to the restoring member including the coil spring 420, and the middle portion of the wire 10 is wound on the drum 110. The restoring member including the coil spring 420 and the buoyant unit 200 pull both ends of the wire 10. When the force of the buoyant unit 200 pulling the wire 10 is greater, the drum 110 is rotated in the forward direction ⓐ, thereby operating the driving shaft 130. When wave force is removed and the force of the restoring member pulling the wire 10 is larger than the force of the buoyant unit 200, the drum 110 is rotated in the backward direction ⓑ, thereby rewinding the wire 10 on the drum 110. In this process, the drum 110 is separated from the power shaft 130 and the power shaft 130 idles.

According to the configuration shown in the figures, since the buoyant unit 200 and the restoring unit are connected to both ends of one wire 10, there is the advantage that wave force applied to the buoyant unit 200 is directly transmitted to the drum 110 and the restoring force of the restoring member is directly transmitted to the wire 10 without a loss, as compared with the case in which the buoyant unit 200 and the restoring member are connected to different wires.

FIG. 7 is a schematic view showing the power converting module of the present invention. An embodiment including an inertia member 170 such as a flywheel and a coupling 190 is shown in FIG. 7.

Referring to FIGS. 5 to 7, the drum 110 and the power shaft 130 are connected to receive tension of the wire 10 generated by waves and an unidirectional rotary member 150 may be disposed in the power converting module 110 to satisfy bidirectional rotation of the drum 110 and preset-directional rotation of the power shaft 130.

The unidirectional rotary member 150 may be disposed between the drum 110 and the power shaft 130.

For example, the unidirectional rotary member 150 may include a one-way clutch. The drum 110 can be rotated in the forward direction ⓐ when the wire 10 is pulled by the buoyant unit 200, and it can be rotated in the backward direction ⓑ such that the wire 10 wound when the force of the buoyant unit 200 pulling the wire 10 is removed. The power shaft 130 can be a rotary shaft of the drum 110 by the unidirectional rotary member 150. The power shaft 130 that is the rotary shaft of the drum 110 can be rotated only in the forward direction ⓐ regardless of the rotational direction of the drum 110 by the unidirectional rotary member 150.

Figure 8:
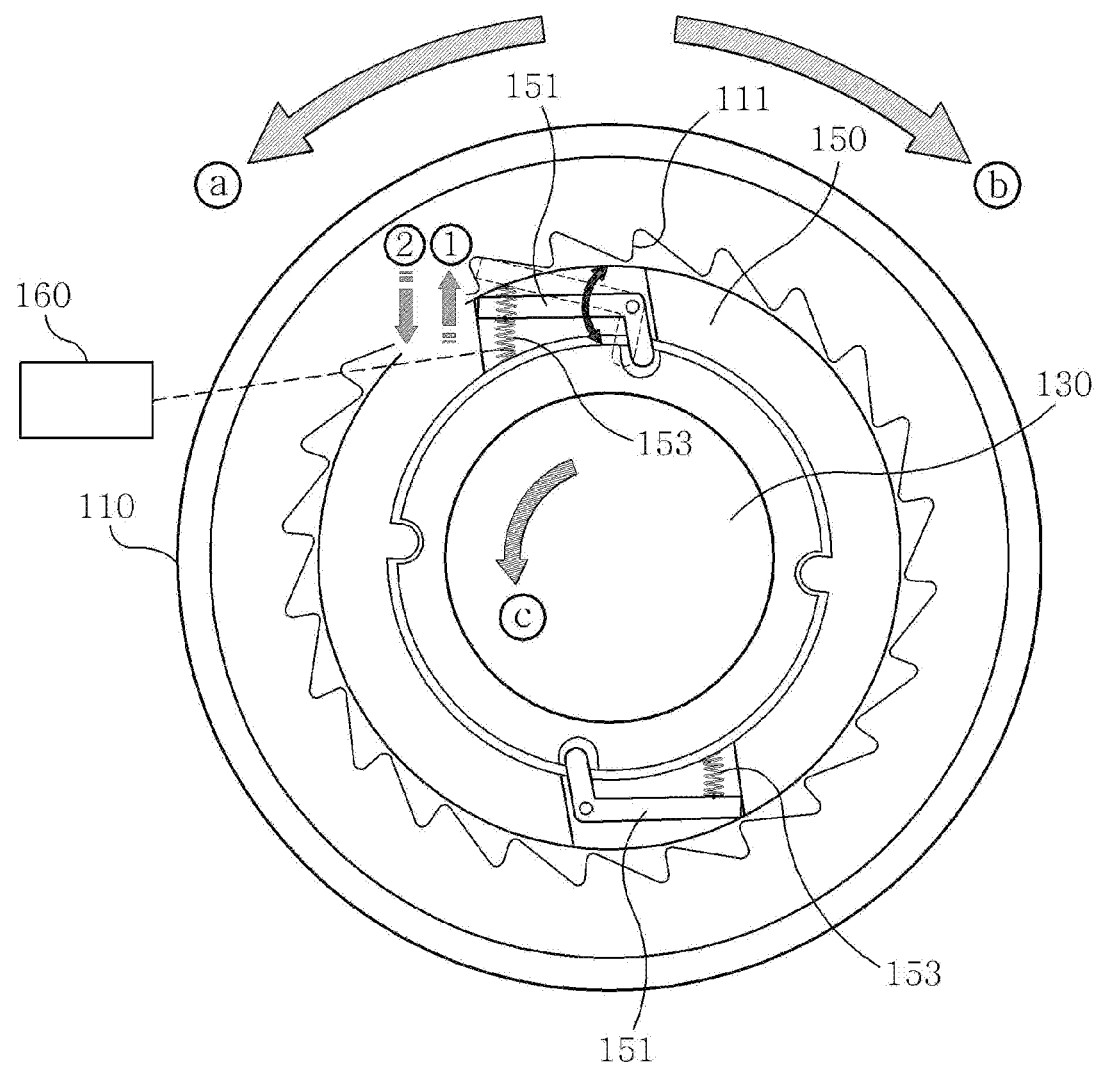
FIG. 8 is a schematic view showing a unidirectional rotary member of the present invention.

FIG. 8 is a schematic view showing the unidirectional rotary member 150 of the present invention.

The unidirectional rotary member 150 may have a stopper 151 that is restricted by the drum 110 or the power shaft 130.

The stopper 151 can restrict the drum 110 and the power shaft 130 when the drum 110 is rotated in the forward direction, and it can release the drum 110 and the power shaft 130 when the drum 110 is rotated in the backward direction.

For example, the unidirectional rotary member 150 may be formed in a hollow pipe shape. The power shaft 130 can be fitted and fixed in the hole of the hollow pipe. The stopper radially protruding or recessed in a latch shape may be disposed on the outer side of the unidirectional rotary member 150. A unidirectional gear 111 inclined in one direction may be formed on the inner side of the drum 110 to correspond to the stopper 151.

The unidirectional rotary member 150 may include an elastic member 153 radially protruding the stopper 151. An end of the stopper 151 can be locked to the unidirectional gear 111 formed on the inner side of the drum 110 by the elastic member 153.

When the drum 110 is rotated in the forward direction ⓐ, the end of the stopper 151 is locked to the unidirectional gear 111, so the unidirectional rotary member 150 can also be rotated in the forward direction ⓐ. Since the power shaft 130 is fixed to the unidirectional rotary member 150, it can be rotated with the unidirectional rotary member 150. The preset direction ⓒ corresponding to the rotational direction of the power shaft 130 is the same as the forward direction ⓐ in this state.

When the drum 110 is rotated in the backward direction ⓑ, the end of the stopper 151 can slide on the unidirectional gear 111. Accordingly, even though the drum 110 is rotated in the backward direction ⓑ, the unidirectional rotary member 150 can keep rotating in the forward direction ⓐ. Accordingly, the power shaft 130 fixed to the unidirectional rotary member 150 can also continuously rotate in the forward direction ⓐ in spite of backward rotation of the drum 110.

When an operation mode of the stopper 151 that restricts the drum 110 and the power shaft 130 when the drum 110 is rotated in the forward direction, and releases the drum 110 and the power shaft 130 when the drum 110 is rotated in the backward direction is defined as a first mode ①, the stopper 151 can be operated in an operation mode different from the first mode. When the stopper 151 has a plurality operation modes, the power converting module 100 may include a mode switch 160 that controls the unidirectional rotary member 150.

For example, the stopper 151 can be operated in the first mode ① or a second mode ② by the mode switch 160. The second mode may be an operation mode in which the stopper 151 releases the drum 110 and the power shaft 130 regardless of the rotational direction of the drum 110.

The mode switch 160 can press the stopper 151 or the elastic member 153 such as a spring that radially protrudes the stopper 151 down to the unidirectional rotary member 150 to implement the second mode. According to the second mode, the elastic member 153 may be pressed down to the outer side of the unidirectional rotary member 150 by the mode switch 160 or the stopper 151 may be pressed down to the unidirectional rotary member 150.

When the stopper 151 is pressed down to the unidirectional rotary member 150 by the mode switch 160, the stopper 151 idles without engaging with the unidirectional gear 111 of the drum 110 regardless of the rotational direction of the drum 110. It is possible to protect the power converting module 110 and the generator 90 from natural disasters such a typhoon. Further, the mode switch 160 can operate the stopper 151 in the first mode in a normal state and it can operate the stopper 151 in the second mode when the power converting module 100 is maintained or the generator 90 is maintained.

It is preferable that the rotational speed of the drum 110 in the forward direction (a) by tension of the wire 10 is uniform. However, the wave force that causes tension in the wire 10 is uneven, so the drum 110 is necessarily rotated in the forward direction (a) by non-uniform force. The power shaft 130 can be rotated in the preset direction (c) with respect to the drum 110 rotating in the forward direction (a). The power shaft 130 connected to the generator 90 can also be rotated at a non-uniform rotational speed due to the drum 110 that is non-uniformly rotated. When the rotational speed of the shaft of the generator 90 is uneven, the generator 90 is easy to be damaged and high-quality electric energy is difficult to obtain. Accordingly, there is a need for a measure for keeping the rotational speed of the power shaft 130 uniform in order to keep the rotational speed of the shaft of the generator 90 uniform.

The power converting unit 100 may include the inertia member 170 to keep the rotational speed of the power shaft 130 uniform in spite of non-uniform force. The inertia member 170 can increase rotational inertia of the power shaft 130 in the preset direction. Alternatively, the inertia member 170 can be disposed at the second end of the wire 10 or on the power shaft 134, whereby it can maintain the rotational speed of the power shaft 130 within a predetermined range.

For example, as shown in FIG. 1, a flywheel may be disposed on the power shaft 130 and can be rotated with the power shaft 130. The flywheel may be the inertia member 170. The inertia member 170, for example, may be any one of a flywheel, a spiral spring, a weight, and a spring as long as it increases the rotational inertia of the power shaft 130.

When the drum 110 is rotated in the forward direction (a) by tension of the wire 10, the power shaft 130 can be rotated in the preset direction (c) by the unidirectional rotary member 150. In this case, moment of the power shaft 130 is increased, and the power shaft 130 can be slowly rotated without departing from the predetermined speed range even if tension is rapidly applied by the increased moment. The moment increased by the flywheel is stored as inertia force of the flywheel.

When the tension of the wire 10 is removed, the drum 110 can wind the wire by rotating in the backward direction (b) by the restoring member. In this process, the power shaft 130 can keep rotating in the preset direction for a predetermined time by the flywheel and the unidirectional rotary member 150. The predetermined time may be time until the next wave comes after a specific wave passes by the buoyant unit 200. If there is no fly wheel, the power shaft 130 may be stopped before the predetermined time is satisfied. However, since the inertia of the power shaft 130 is increased by the inertia force corresponding to the moment stored in the flywheel, the power shaft 130 can keep rotating for the predetermined time.

By the inertia member 170 such as a flywheel, rapid high-speed rotation of the power shaft 130 can be prevented and rotation at very low speed of the power shaft 130 can be prevented. Accordingly, the rotational speed of the power shaft 130 can be appropriately maintained within a predetermined range suitable for the operation of the generator 90.

When a flywheel is used, the installation space of the inertia member 170 can be minimized. When a plurality of wires 10 is connected to the power converting module 100, interference among the wires 10 can be reduced.

Figure 9:
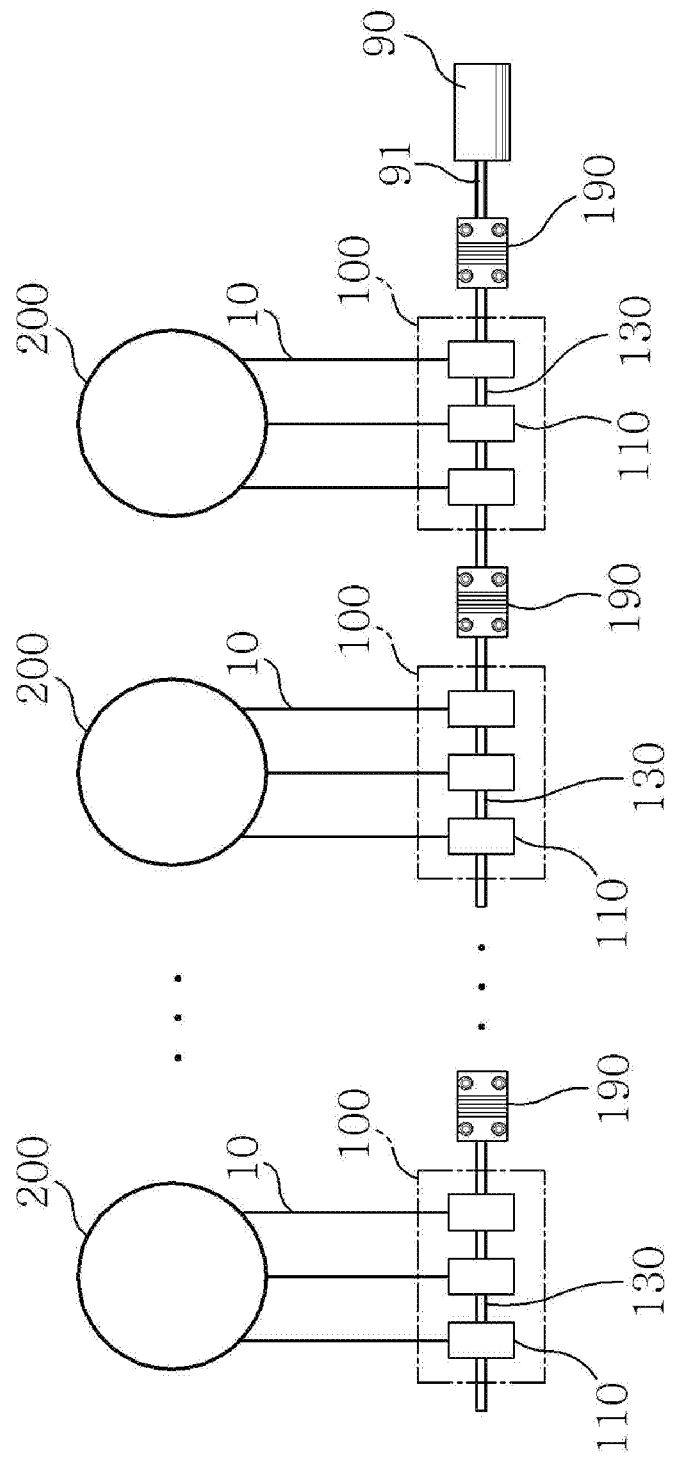
FIG. 9 is a schematic view showing a power converting module according to an embodiment of the present invention.
Figure 10:
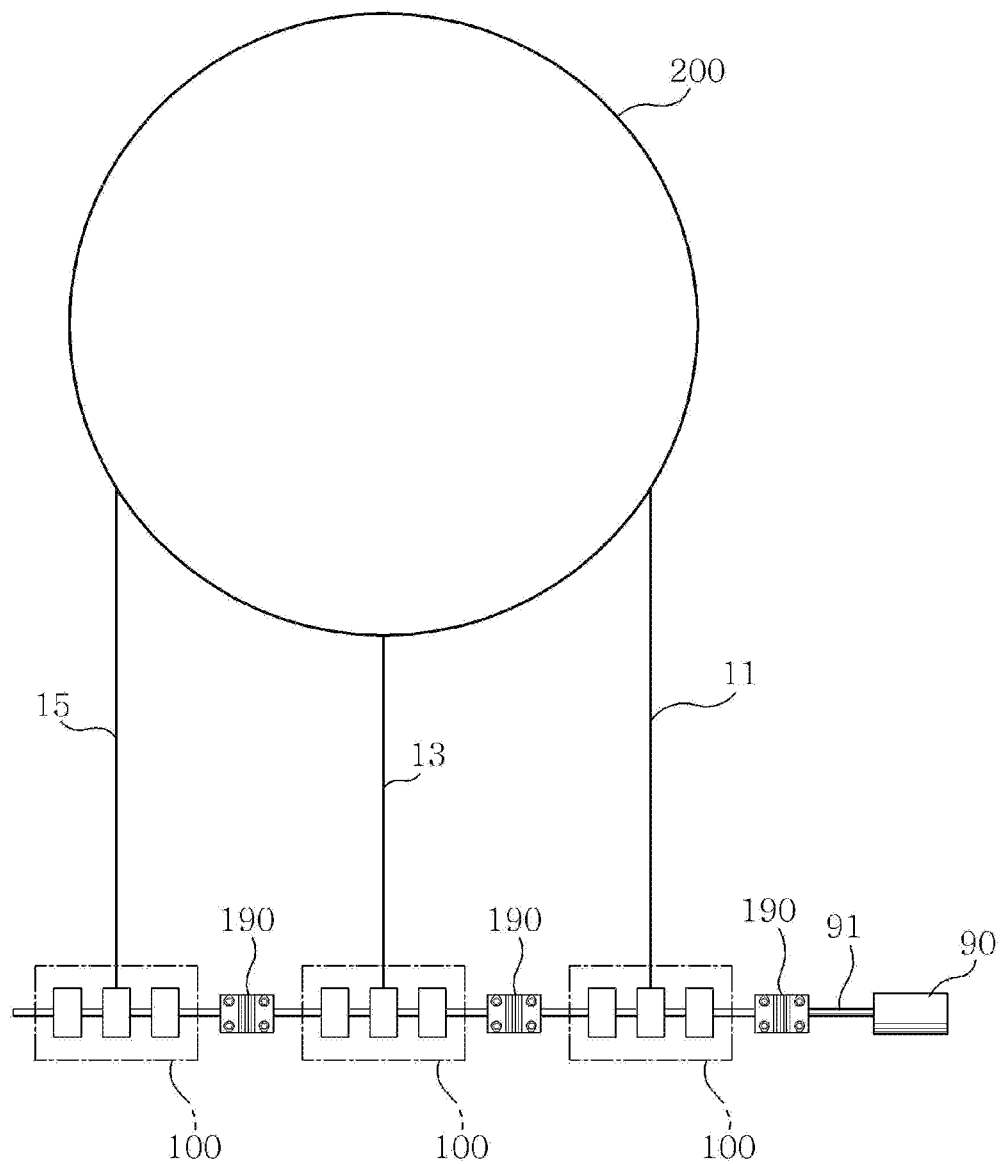
FIG. 10 is a schematic view showing a power converting module according to another embodiment of the present invention.

FIG. 9 is a schematic view showing the power converting module 100 according to an embodiment of the present invention. FIG. 10 is a schematic view showing a power converting module 100 according to another embodiment of the present invention.

The size and the number of the buoyant unit 200 that is installed on the sea may depend on the installation environment. For example, a plurality of small buoyant unit may be suitable for a specific area, as shown in FIG. 9, and a large single buoyant unit may be suitable for another area, as shown in FIG. 10. Accordingly, the gaps and the number of wires 10 connecting the buoyant unit 200 and the power converting unit 100 can also be variously changed.

Various gaps of the wires 10 may be partially removed by an assistant redirection unit 390 installed on the seafloor 70. The assistant redirection unit 390 may be disposed between the base unit 300 and the power converting module 100 and can standardize the gaps and directions of the wires 10 that are input to the power converting module 100. However, the problem with the gaps of the wires 10 is difficult to fundamentally solve even though the assistant redirection unit 390 is provided. Further, it is difficult to provide the assistant redirection unit 390 to fit to the number of the wires 10 that depends on places. Accordingly, there is a need for drums 110 that are arranged with different gaps, depending on installation environments. Further, the number of the drums 110 disposed on the power shaft 130 should be changed in accordance with installation environments. In other words, the power converting module 100 should be manufactured in different dimensions in accordance with installation environments.

However, the power converging modules 100 manufactured in different dimensions have a problem of low compatibility and the installation method is changed in accordance with the dimensions, so installation and maintenance are difficult. It is preferable to equally manufacture the power converting module 100 to secure compatibility and make installation and maintenance convenient. In other words, the power converting modules 100 can be so-called standardized.

A measure for standardizing the power converting module 100 is described hereafter.

A first end of the wire 10 can be connected to a connection point of the buoyant unit 200 and a second end of the wire 10 can be wound on the drum 110 of the power converting module 100. The drum 110 may be provided as many as the number of the wires 10 connected to at least one buoyant unit 200. The drums 110 may be arranged at different positions in the longitudinal direction of the power shaft 130. The drums 100 may be formed such that the wires 10 are unwound in the same direction so that one power shaft 130 with the drums 110 thereon is rotated in the preset direction.

The power shafts of the power converting modules 100 may have the same length and the drums 110 may be arranged with predetermined gaps on the power shafts 130. When the wire 10 is disposed at a first position in the longitudinal direction of the power shaft 130, the wire 10 can be wound on the drum 110 at the first position. It is required to wind a wire at a second position spaced apart from the first position and the power shaft 130 may not extend to the second position. In this case it is possible to connect another power shaft 130 at the second position to the power shaft 130 at the first position and to wind a wire 10 on the drum 110 on the power shaft 130 at a position corresponding to the second position.

The uniaxial power converting apparatus of the present invention may include the coupling 190 connecting a plurality of power converting modules 100. The power converting modules 100 can be separably connected by the coupling.

The coupling 190, which is a member for connecting a plurality of rotary shafts, may have a hole wound in a spring shape at the middle portion of the side. When a plurality of rotary shaft is connected, they are substantially difficult to connect completely in parallel. Accordingly, the rotary shafts are connected with small angles, so when they are connected by a rigid connecting member, various mechanical problems may occur. However, the coupling can solve the non-parallel problem of rotary shafts while transmitting torque to the rotary shaft because of the spring-shaped hole at the middle portion.

The coupling 190 can connect a first end of the power shaft 130 of a specific power converting module 100 to a second end of the power shaft of another power converting module 100. A drum 110 can be added in the unit of the length of the power 130 by the coupling 190. For example, when a first power shaft and a second power shaft are connected by the coupling 190, a second drum on the second power shaft can be spaced apart from a first drum on the first shat by the length of the power shaft 130.

The wire 10 extending from the buoyant unit 200 can perpendicularly cross the power shaft 130 and can be wound on the drum 110 that is closest to the crossing point. A plurality of power shafts connected by the coupling 190 and coaxially arranged is rotated together and the shaft 91 of the generator 90 can be linked to at least one of the power shafts 130.

For example, it is assumed that the power shaft 130 extends 1 meter.

A first power shaft and a first drum on the first power shaft can be used to connect a wire 10 at a first position. When the wire 10 at a second position spaced 1 meter apart from the first position is connected to the first power shaft, the wire 10 is inclined with respect to the first power shaft and it is difficult to normally operate the first drum even if it is wound on the first drum.

By connecting the second power shaft to the first power shaft using the coupling 190, the second drum on the second power shaft is added at 1 meter from the first position that corresponds to the length of the power shaft 130. Further, the second drum may perpendicularly face the wire 10 at the second position. Accordingly, the wire 10 at the second position can be wound on the second drum without a difficulty.

In FIG. 9, power converting modules 100 including a plurality of, for example, three standardized drums 110 are connected by the coupling 190. Three wires 10 extending from a buoyant unit 200 are connected to each of the power converting module 100.

The power converting module in FIG. 10 and the power converting modules 100 in FIG. 9 are the same. However, the buoyant unit 200 is much bigger than those shown in FIG. 9. The gaps of a first wire 11, a second wire 13, and a third wire 15 extending from the buoyant unit 200 may be larger than the gaps among three drums 110 in one power converting module 100. For example, the gaps of the wires 10 may be 1 meter and the gap of the drums 110 may be 0.3 meter. In this case, when three power converting modules 100 each having a power shaft of 1 meter length are connected, the wires 10 can be easily connected to the drums 110.

For example, a first power converting module 100, a second power converting module 200, and a third power converting module 100 that have the same dimensions can be connected by the coupling 190 to connect the first wire 11, the second wire 13, and the third wire 15.

The first wire 11 can be wound on one of the three first drums on the first power shaft of the first power converting module 100. A wire 100 may not be wound on the other two of the three first drums on the first power shaft.

The second power shaft of the second power converting module 100 can be connected to the first power shaft by the coupling 190. One of the three second drums on the second power shaft can perpendicularly face the second wire 13 and the second wire 13 can be wound on the drum. A wire 100 may not be wound on the other two of the three second drums on the second power shaft.

The third power shaft of the third power converting module 100 can be connected to the second power shaft by the coupling 190. One of the three third drums on the third power shaft can perpendicularly face the third wire 15 and the third wire 15 can be wound on the drum. A wire 100 may not be wound on the other two of the three third drums on the third power shaft.

When the first wire 11 is pulled by the buoyant unit 200, the first drum can be rotated in the forward direction (a), all of the first power shaft, second power shaft, and third power shaft can be rotated in the same preset direction by the coupling 190. Similarly, even though the second wire 13 is pulled and the second drum is rotated in the forward direction (a) or the third wire 15 is pulled and the third drum is rotated in the forward direction (a), all of the power shafts 130 can be rotated together in the same preset direction. Accordingly, when the shaft 91 of the generator 90 is connected to at least one of the first power shaft, the second power shaft, and the third power shaft, the generator 90 can be normally operated.

According to the embodiments shown in FIGS. 9 and 10, it can be seen that wires 10 extending from buoyant units 200 having various dimensions can be connected, as long as a plurality of power converting modules 100 having the same dimension is provided.

Figure 11:
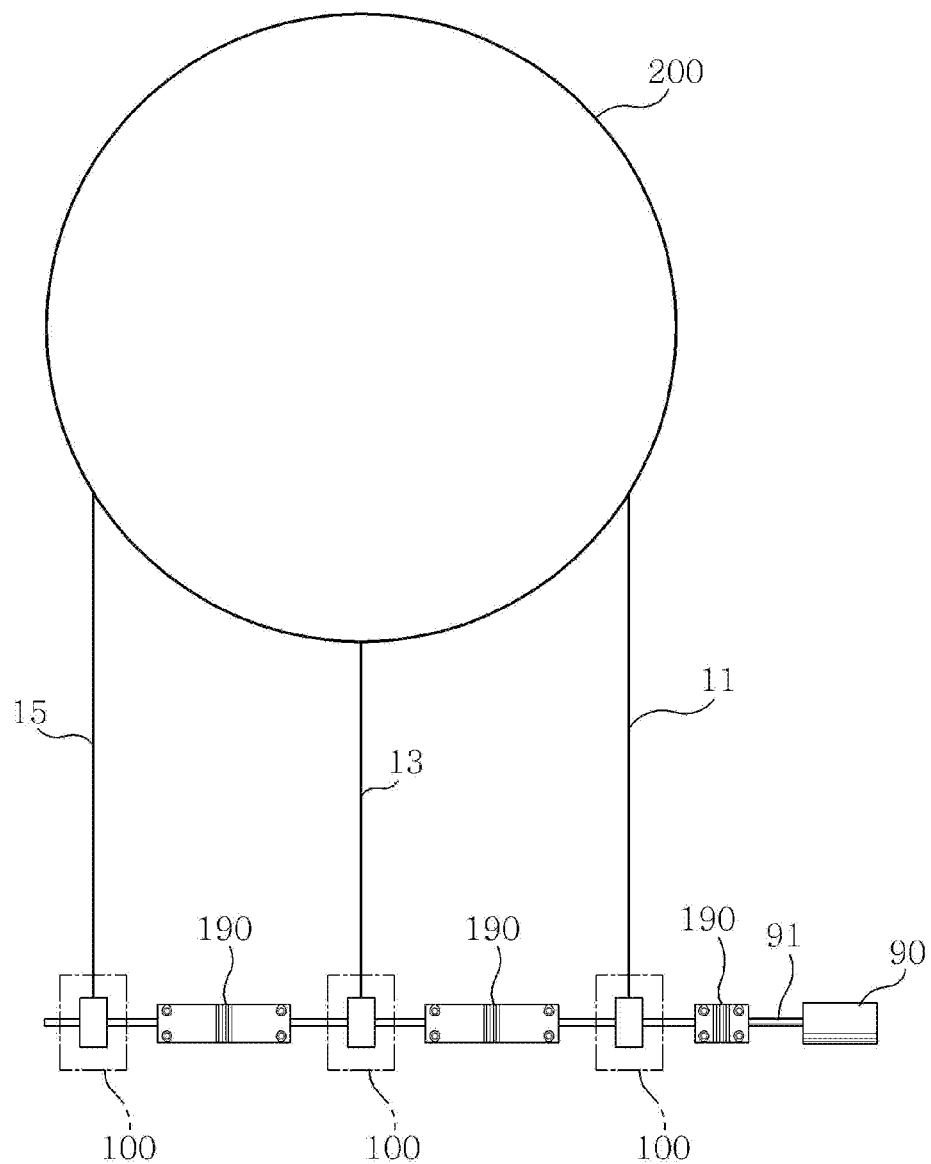
FIG. 11 is a schematic view showing a power converting module according to another embodiment of the present invention.

FIG. 11 is a schematic view showing a power converting module 100 according to another embodiment of the present invention.

According to the power converting module 100 shown in FIG. 11, one drum 110 can be installed on one power shaft 130. However, the length of the power shaft may be shorter than the power shaft on which a plurality of drums 110 is installed. For example, the power shaft 130 according to the embodiment of FIG. 11 may have a length of 0.5 meter.

When the first wire 11 and the second wire 13 are spaced 1 meter apart from each other, a total of three power shaft 130 can be connected by the coupling 190 to provide a drum 110 perpendicularly facing the first wire 11 and the second wire 13. In this case, the power shaft 130 in the middle can be used to simply be connected to other power shafts 130. In this case, the coupling 190 may extend 0.5 meter to exclude an unnecessary power converting module 100. When the coupling 190 having a length of 0.5 meter is applied, the unnecessary power converting module in the middle can be excluded.

When couplings 190 having various lengths are provided in accordance with use environments, it may be advantageous in standardization of power converting modules 100. For example, even if a power converting module 100 having a plurality of drums 110 on one power shaft 130 is standardized and manufactured or a power converting module 100 having one drum 110 on one power shaft 130 is standardized and manufactured, power converting modules 100 standardized for various environments can be applied by selecting the length of the coupling 190 connecting the power shafts 130.

Figure 12:
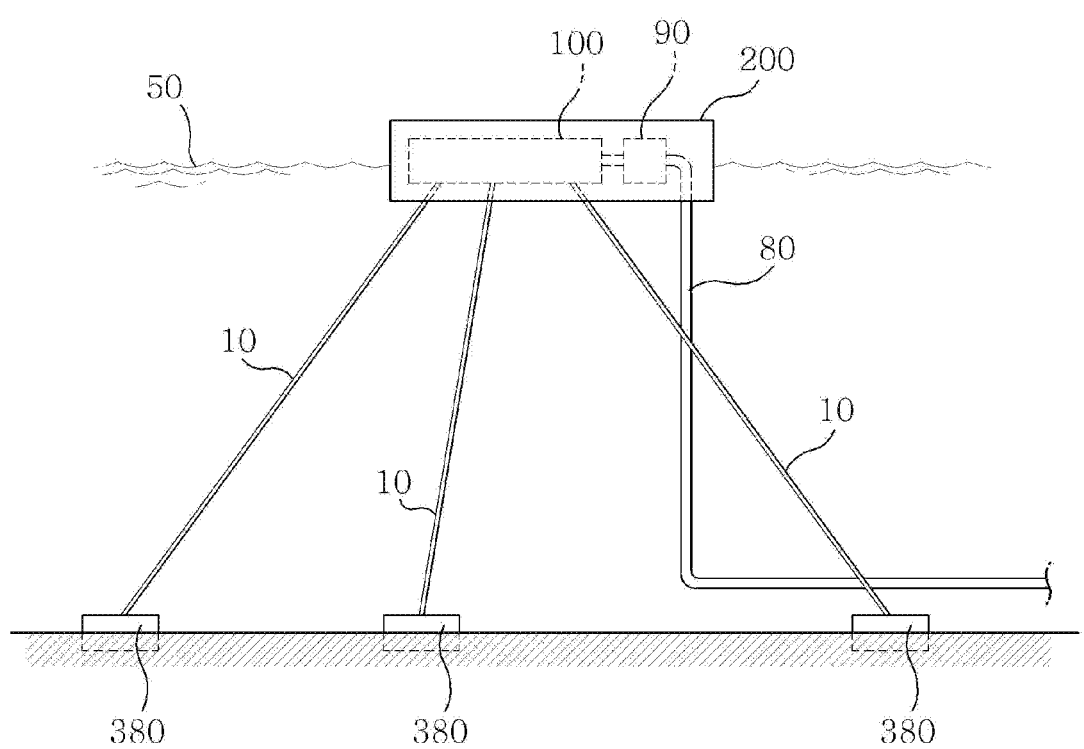
FIG. 12 is a schematic view showing a uniaxial power converting apparatus of the present invention applied to a buoyant wave power generation apparatus.
Figure 13:
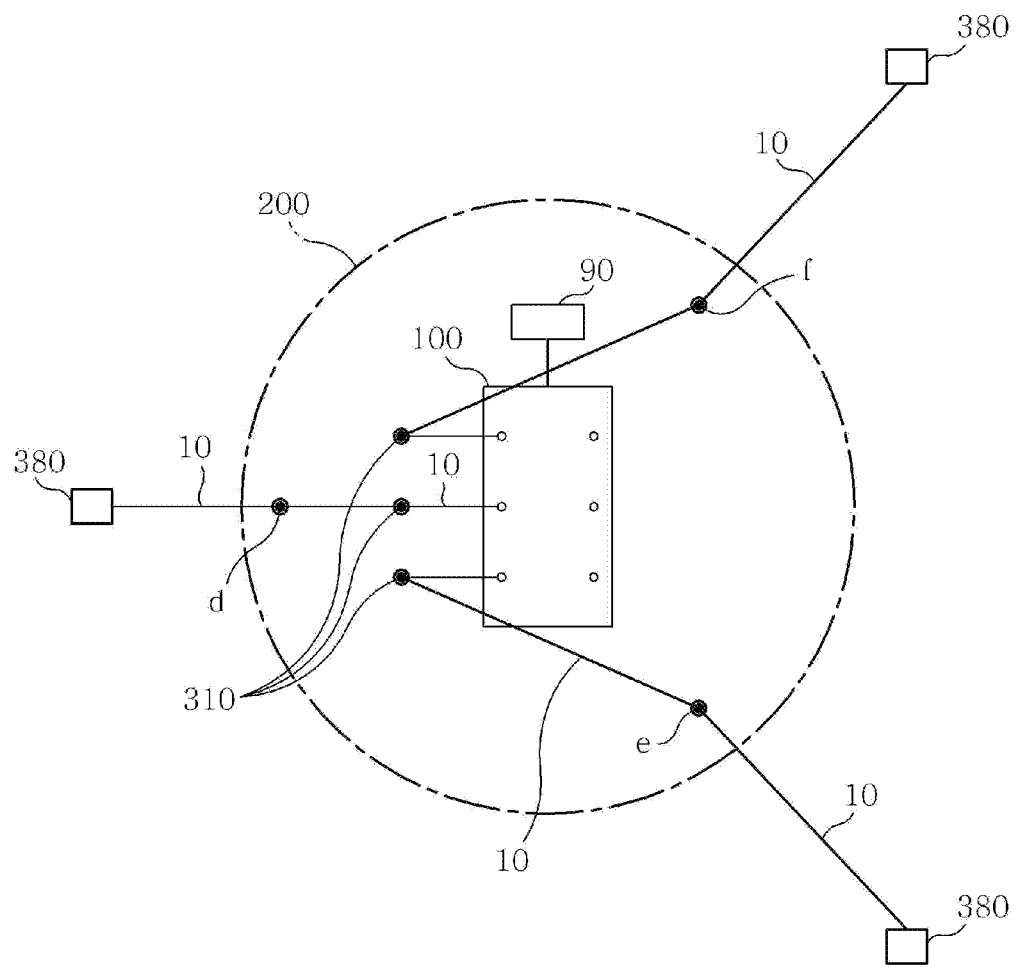
FIG. 13 is a plan view of the uniaxial power converting apparatus applied to a buoyant wave power generation apparatus.

FIG. 12 is a schematic view showing a uniaxial power converting apparatus of the present invention applied to a buoyant wave power generation apparatus. FIG. 13 is a plan view of the uniaxial power converting apparatus applied to a buoyant wave power generation apparatus.

The power converting module 100 may be installed on the sea. For example, the power converting module 100 can be installed on a buoyant unit 200 floating on the sea surface 50. It can be determined as a buoyant wave power generation apparatus. The uniaxial power converting apparatus of the present invention may be suitable especially for a buoyant wave power generation apparatus.

In a buoyant wave power generation apparatus, a generator 90 connected to the power converting module 100 can also be installed on the buoyant unit 200. The generator 90 and the power converting module 100 installed on the buoyant unit 200 can be floated on the sea together with the buoyant unit 200. According to this embodiment, a wire 10 supporting the buoyant unit 200 does not need to extend to the land from the sea. However, a transmission cable 80 that transmits electricity produced by the generator 90 to the ground can be installed.

In the buoyant wave power generation apparatus shown in FIG. 12, an anchor that fixes a first end of a wire 10 can be provided instead of the redirection unit under the sea. The wire 10 with the first end connected can be held on the redirection unit 310 through a connection point.

The redirection unit 310 can be installed on the buoyant unit 200 together with the generator 90 and the power converting module 100 and can be floated on the sea together with the buoyant unit 200.

Second ends of the wires 10 with the first ends connected to the anchors 380 may be input to the drums from the same sides with respect to the power shafts 130 so that drums 110 connected to the wires 10 are all rotated in the same direction.

The redirecting units may be disposed on all the same sides of the power shafts 130 such that the wires 10 are input to the same sides of the power shafts 130.

It is preferable that the power converting module 100 is configured in a maximally simple structure not to reduce buoyancy of the buoyant unit 200. Accordingly, when a predetermined number of wires 10 are installed on the buoyant unit 200, the power converting module 100 may include a single power shaft 130 and drums 110 installed on the single power shaft 130 by the number of the wires 10. For example, power converting modules 100 that are installed on buoyant units 200 may be formed to be the same as those in the embodiment shown in FIG. 9.

The invention claimed is:

1. A uniaxial power converting apparatus comprising:
a buoyant unit moored to the seafloor;
wires by which the buoyant unit is moored and to which kinetic energy of waves is input, the wires comprising three or more wires connected to the buoyant unit, each of the wires having a first end connected to the buoyant unit and a second end;
a plurality of redirecting units around which the wires are wound and changing a direction of the wire;
a generator;
a power converting module transmitting tension of the wire to the generator,
wherein the power converting module comprises:
a power shaft connected with the generator, the power shaft being a single power shaft;
a plurality of drums on which the second ends of the wires are wound;
unidirectional rotary members disposed between the drums and the power shaft; and
a restoring member connected to the drums and comprising at least one of a spiral spring, a spring, and a weight that rotates the drum in the backward direction,
wherein a driving force is transmitted to the power shaft from the drum; the number of the drums is at least the number of the wires connected to the buoyant unit;
the drums are arranged at different positions in a longitudinal direction of the power shaft and unwinding directions of the wires are the same;
the power converting module drives the generator by only the single power shaft on which the drums are installed;
each of the drums is formed in a cylindrical shape and each of the drums is rotated in a forward direction in which the wire is unwound and in a backward direction in which the wire is wound;
the drums are rotated in the forward direction when the wires are pulled by the buoyant unit, and are rotated in the backward direction so that the wires are wound when a force of the buoyant unit pulling the wires is removed;
the power shaft is a rotary shaft of the drums by the unidirectional rotary members and is rotated only in the forward direction regardless of a rotational directions of the drums; and
wherein, when a wave is gone and the tension of the wires is removed, the wires are rewound on the drums to prepare for a next wave, and the drums are rotated backward for rewinding the wires.

2. The uniaxial power converting apparatus of claim 1, wherein the power converting module further includes a mode switch controlling the unidirectional rotary members;
each of the unidirectional rotary members has a stopper restricted to each drum or the power shaft;
the stopper is operated in a first mode or a second mode by the mode switch;
the first mode is an operation mode in which the drums and the power shaft are restricted when the drums are rotated in a forward direction and the drum and the power shaft are released when the drums are rotated in a backward direction; and
the second mode is an operation mode in which the stopper releases the drum and the power shaft regardless of a rotational direction of the drum.

3. The uniaxial power converting apparatus of claim 1, wherein the power converting unit comprises a plurality of power converting modules; and the power converting modules are separably connected to one another by a coupling.

4. The uniaxial power converting apparatus of claim 1, wherein when a plurality of power converting modules is provided, a coupling connecting the power converting modules is provided; and the power converting modules are formed in the same shape or size.

5. The uniaxial power converting apparatus of claim 1, wherein when a plurality of power converting modules is provided, and a coupling connecting the power converting modules is provided;

the coupling connects a first end of a power shaft of a specific power converting module to a second end of a power shaft of another power converting module;

the drums are added in the unit of a length of the power shafts by the coupling;

the wire extending from the buoyant unit perpendicularly crosses the power shaft and is wound on a drum closest to a crossing point; and the power shafts connected by the coupling are rotated together and the generator is linked to at least one of the power shafts.

6. The uniaxial power converting apparatus of claim 1, wherein the power shaft is rotated by the drums;

the drums are capable of being rotated in a forward direction in which the wire is unwound and in a backward direction in which the wire is wound; and the power shaft can be rotated only in a preset direction.

7. The uniaxial power converting apparatus of claim 1, wherein the generator and the power converting module are installed on the buoyant unit and are floated together with the buoyant unit.

8. The uniaxial power converting apparatus of claim 7, wherein the redirecting unit is installed on the buoyant unit together with the generator and the power converting module and is floated together with the buoyant unit.

* * * * *